C. CAMPBELL.
Machine for Breaking Broom Corn.
No. 35,214.
Patented May 13, 1862.
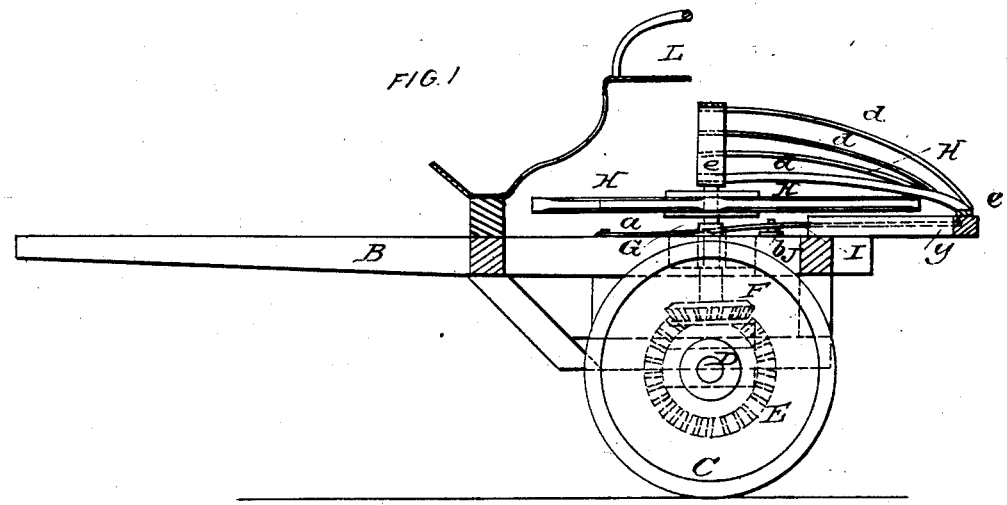
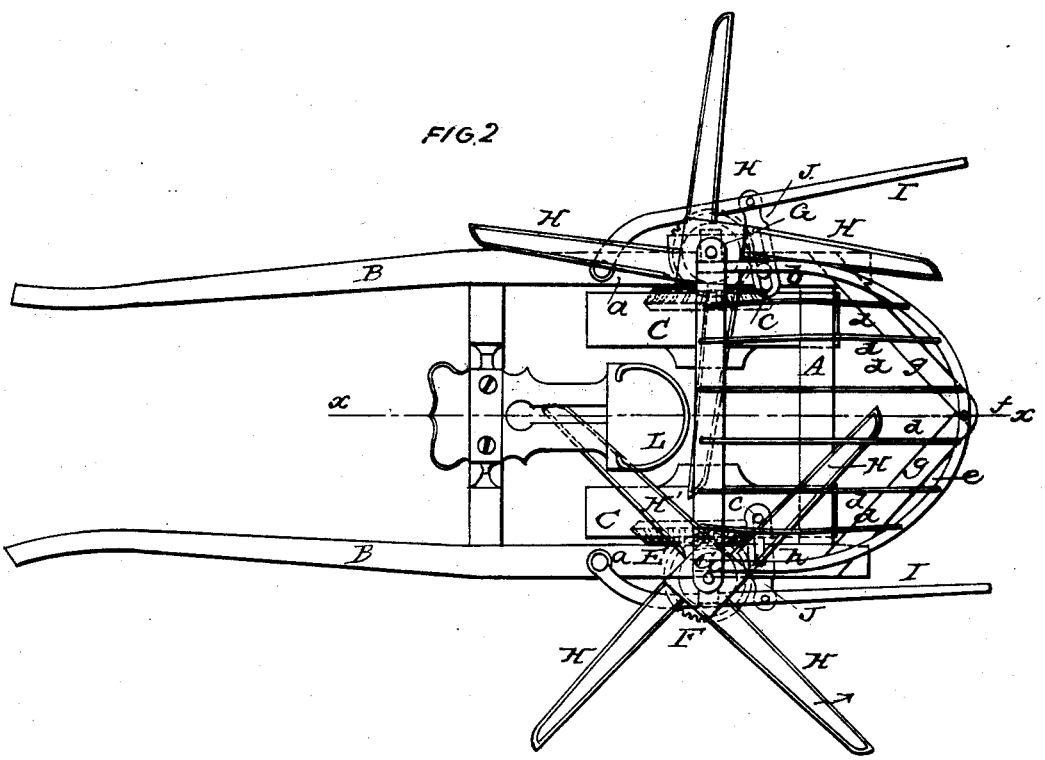

UNITED STATES PATENT OFFICE.

CHARLES CAMPBELL, OF YELLOW HEAD, ILLINOIS.

IMPROVED MACHINE FOR BREAKING BROOM-CORN.

Specification forming part of Letters Patent No. 35,214, dated May 13, 1862.

*To all whom it may concern:*

Be it known that I, CHARLES CAMPBELL, of Yellow Head, in the county of Kankakee and State of Illinois, have invented a new and Improved Machine for Breaking Broom-Corn; and I do hereby declare that the following is a full, clear, and exact description of the same, reference being had to the accompanying drawings, making a part of this specification, in which—

Figure 1 is a side sectional view of my invention, taken in the line $x$ $x$, Fig. 2; Fig 2, a plan or top view of the same.

Similar letters of reference indicate corresponding parts in the two figures.

This invention relates to a new and improved machine for breaking broom-corn preparatory to the harvesting thereof, and is designed to supersede the manual operation of bending the stalks or stems of the standing broom-corn to facilitate its drying.

The invention consists in the employment or use of revolving beaters, stationary adjustable break-irons or bars, and a guard-shield for the beaters, arranged as hereinafter fully shown and described.

To enable those skilled in the art to fully understand and construct my invention, I will proceed to describe it.

A represents a rectangular frame, which is provided with thills B B, and mounted on two wheels, C C, which are attached permanently to their axle D, the latter being fitted in proper bearings underneath the frame A. The wheels and their axle consequently rotate together, and to the outer side of each wheel C there is attached concentrically a bevel-guard, E. These gears mesh into pinions F F, which are placed on the lower parts of vertical shafts G G, which are placed one at each side of the frame A.

On the upper end of each shaft G there are secured at right angles beaters H, two or more, as desired, at equal distances apart. In Fig. 2 four beaters are shown attached to each shaft. These beaters work directly over the frame A, and parallel with it, and of course extend or work out from the frame at each side a distance equal to their length, as their shafts G are at the sides of the frame.

To each side of the frame A, at its upper part, there is attached a bar, I. These bars I may be of metal, and they are attached at their front ends to the frame A by pivots $a$, and at points near their centers they are pivoted to slides J, which are attached to the upper surface of the frame A by set-screws $b$, which pass through oblong slots $c$ in the slides J. By means of this connection of the slides J to the frame A the bars I may be adjusted parallel with the sides of the frame A, or more or less angularly with it, as may be desired. This will be fully understood by referring to Fig. 2. The bars I are directly under the beaters H, as shown clearly in Fig. 1.

K is a guard or shield, which is formed of metal rods $d$, secured at their ends to a bow-shaped frame, $e$, the inner part of which is curved in a vertical plane in the form of an arc. The other part of this frame is curved in the form of an arc in a horizontal plane, as shown clearly in Fig. 2. The rods $d$ are secured longitudinally with the frame A in the frame $e$ and parallel with each other. The inner part of the frame $e$ is fitted on the upper ends of the shafts G G, while the outer part is secured by a bolt, $f$, to the outer ends or junction of two oblique bars, $g$ $g$, attached to the back part of frame A. In consequence of the inner end of the frame $e$ being curved in a vertical plane, the rods $d$ have an inclined position and are curved, so that the guard or shield may be described as forming a longitudinal section of a prolate spheroid. The guard or shield is directly between the bars I I, and the beaters H behind the shafts G G, as shown in Fig. 2.

L is the driver's seat, which is secured to the front part of the frame A.

The operation is as follows: As the machine is drawn along, the draft-animal being between the rows of broom-corn, the beaters H are rotated in the direction indicated by the arrows 1 through the medium of the gearing E F, and the broom-corn is broken between the beaters and the bars I, the latter serving as a stay or rest for the standing stems or stalks while the beaters act upon them. The beaters work or rotate underneath the guard or shield K, and the latter prevents the stems or stalks becoming entangled with or wrapping themselves around the beaters. Two rows of broom-corn, it will be seen, are acted upon simultaneously, one now at each side of the machine. When it is desired to have the bars I parallel with the sides of the frame A, they can be readily so adjusted, and also readily adjusted obliquely with it when it is necessary to have the beaters H strike the stems or stalks of broom-corn obliquely.

Having thus described my invention, what I claim as new, and desire to secure by Letters Patent, is—

1. The revolving beaters H and stationary bars or break-irons I, placed on a mounted frame, A, and arranged to operate as and for the purpose herein shown and described.

2. The combination of the revolving beaters H, bars or break-irons I, and guard or shield K, all arranged or placed on a mounted frame, A, for joint operation, as and for the purpose herein set forth.

CHARLES CAMPBELL.

Witnesses:
 ROYAL LUTTER,
 DANFORTH TOOMBS.